United States Patent

[11] 3,576,076

| [72] | Inventor | Bernard Weissman<br>304 Ashland Place, Brooklyn, N.Y. 11217 |
|---|---|---|
| [21] | Appl. No. | 832,940 |
| [22] | Filed | June 13, 1969 |
| [45] | Patented | Apr. 27, 1971 |

[54] ADJUSTABLE ROTATABLE TOOL AND A HOLDER THEREFOR
10 Claims, 8 Drawing Figs.

[52] U.S. Cl. .................................................. 32/48, 279/97
[51] Int. Cl. ................................................. A61c 3/02
[50] Field of Search .................................... 32/46, 48; 77/70; 279/97, 95, 84

[56] References Cited
UNITED STATES PATENTS

| 1,315,100 | 9/1919 | Dufresne | 279/97 |
| 2,529,396 | 11/1950 | Hunt | 279/97 |
| 3,484,114 | 12/1969 | Roden | 279/97 |

*Primary Examiner*—Robert Peshock
*Attorney*—Friedman & Goodman

ABSTRACT: In combination an adjustable rotatable tool, e.g., dental drill and a holder therefor, the drill comprising a straight shank drill provided with graduated recesses along its shank, for selectively positioning the drill within the holder. The holder further comprising a locking device for releasably holding the drill at the selected position and being adapted to be itself mounted within a dental handpiece.

PATENTED APR 27 1971
3,576,076
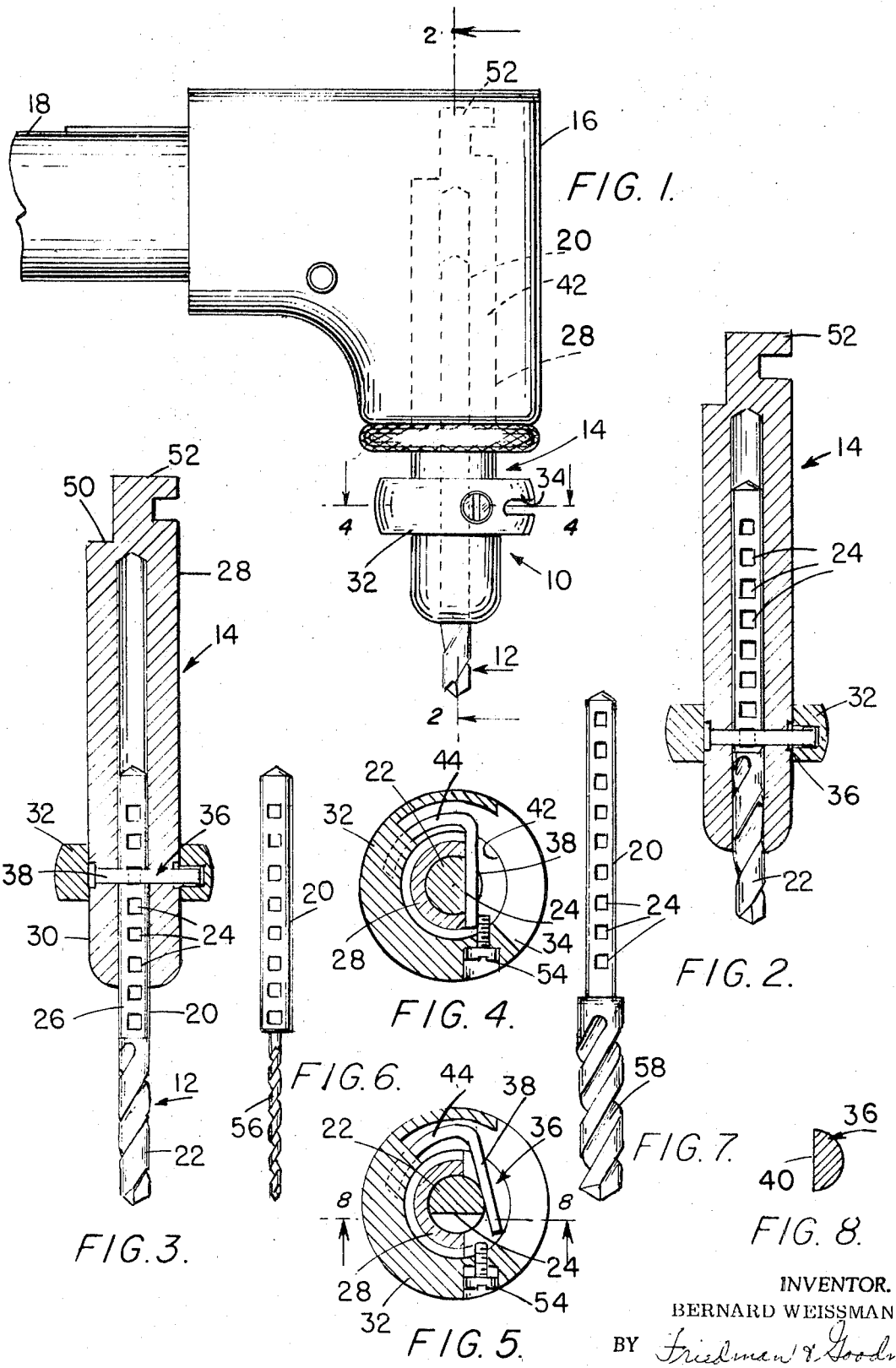
INVENTOR.
BERNARD WEISSMAN
BY Friedman & Goodman
Attorneys

ADJUSTABLE ROTATABLE TOOL AND A HOLDER THEREFOR

BACKGROUND OF THE INVENTION

1. Field of the Invention

The invention relates generally to dental tools and more particularly, to an adjustable dental tool and a holder therefor.

2. Description of the Prior Art

As is well known, the field of dentistry involves highly delicate work in usually restricted areas. It is oftentimes necessary to employ the drill in a manner such that it will not project too far from the dental handpiece holding it. Generally, what can be done is to push the drill further into the handpiece. However, this is not exact and does involve a good deal of guess work in proper positioning. It would, therefore, be highly desirable to provide a drill which can be selectively positioned to a desired extent and, moreover, it would be highly desirable to provide a holder which is adapted to hold this drill.

SUMMARY OF THE INVENTION

It is, therefore, among one of the principal objectives of the invention to provide an adjustable tool, such as a drill, and a holder therefor which holder is adapted to releasably mount the adjustable drill.

In accordance with the present invention, there is provided in combination an adjustable dental drill and a holder therefor, said drill further comprising a straight shank drill provided with graduated recesses along its shank for selectively positioning the drill within the holder, the holder further comprising a locking device for releasably holding said drill at the selected position, said holder being adapted to be itself mounted within a dental handpiece. While the invention is well suited for drilling operations, it is to be understood that the adjustable tool may include, as well, various drills, broaches, reamers, files, seating instruments in general, and prophylactic wheels and brushes. Moreover, the invention is not restricted to the dental art but may be readily applicable in such fine arts as jewelry and watchmaking and repair.

BRIEF DESCRIPTION OF THE DRAWING

FIG. 1 is a side view showing the invention combination of drill and holder mounted within the housing of a dental handpiece.

FIG. 2 is a sectional view of the inventive device taken along line 2-2 of FIG. 1.

FIG. 3 is a view similar to FIG. 2 except that the drill is shown mounted at a different position along its shank in the manner according to the invention.

FIG. 4 is a sectional view taken along line 4-4 of FIG. 1.

FIG. 5 is a view similar to FIG. 4 except that the drill is shown in a declutched condition in accord with a specific feature of the invention.

FIGS. 6 and 7 are elevational views showing the drill in two different embodiments.

FIG. 8 is a sectional view of the spring portion of the holder taken along line 8-8 of FIG. 5.

DESCRIPTION OF THE SPECIFIC EMBODIMENTS

Referring now to the FIGS. of the drawing in detail and specifically to FIG. 1, there is illustrated the invention combination 10 comprising an adjustable drill 12 and a holder 14 therefor, and as shown, mounted within the housing 16 of a dental handpiece 18, the latter only partially shown since the invention lies elsewhere as will be seen. For present purposes suffice it to say that the housing and the dental handpiece are of a conventional construction well known to the art.

The adjustable drill 12 consists of a straight shank portion 20 of circular cross section and a drill bit portion 22, which can be of conventional construction. In accord with a feature of the invention, the straight shank 20 is provided with regularly spaced graduated recesses 24, vertically aligned along a portion of the wall 26 thereof. For example, the recesses can be in 1 mm. increments and 0.020 inch deep.

The holder 14 comprises a hollow cylindrically shaped stem 28 rotatably mounted at one end 30 within a circular collar 32. A passage 34 extends through one side of the collar. This passage is provided for a spring 36 mounted to the collar 32 so that rotation of the collar will result in the carrying of the spring along with it. The spring 36 (FIG. 8) has a generally semicircular shape in cross section with the flat surface 40 thereof facing and extending into the bore 42 provided by the hollow interior of the stem 28. The spring 36 is also shaped along its length in a straight portion 38 which is extendable into bore 42 and a curved portion 44 which is connected to the circular collar 32. Thus, as hereinabove mentioned, rotation of the collar carries the spring along with it.

In order to mount a drill within the holder 14, what is done is to rotate the collar until the spring 36 and its straight surface 40 is removed from projection into the bore 42. The shank of a drill having graduated recesses 24 is then inserted into the bore 42. The collar is then rotated until the flat surface of spring 36 again projects into the bore 42 and resultingly locks the drill shank 26 in place, i.e., spring straight portion 40 registering in a recess 24. The drill is now in a "clutched" condition, that is the rotation of the shaft 28 will in turn rotate the drill locked therein. It can be seen by looking at FIGS. 2 and 3 that the drill shank can be mounted at various positions along its entire length via the graduated recesses 24. Thus, in FIG. 2, there is shown a situation where the drill bit 22 is allowed to project only a minimal amount from the holder 14, and in FIG. 3, the drill bit is projected relatively quite far from the holder.

At the other end 50 of the holder, there is mounted an eccentric head 52 so that the holder and its drill is adapted to be in turn mounted into the housing 16. The drill and holder are now ready to be operated and the motor driving the dental handpiece is turned on. The rotatable stem 28 rotates within the housing 16, in turn carrying the collar and adjustable drill 12 with it. So long as the drill is operating smoothly, the "clutching" action shown in FIG. 4, i.e., with the drill being rotated by the housing, will prevail and the drill will continue to turn. If an impediment is reached during the drilling operation and the drill bit 22 can no longer proceed, then in turn the stem 28 will rotate within the collar 32 thereby "declutching" or disengaging the drill 12. This is more readily understood by referring to FIG. 5 where it can be seen that the spring 36 has been displaced out of the recess 24 so that while the stem 28 may be rotating inside the collar 32, the drill is no longer rotating. Thus, there is afforded a safety factor in the employment of the inventive combination, and that is the drilling action can be disengaged upon the occurrence of an impediment to the drilling operation.

In a specific embodiment as shown in FIG. 4, a threaded screw 54 may be provided through the collar 32 and projecting into bore 42 for locking spring 36 in clutched place during the drilling operation, if desired.

FIGS. 6 and 7 show two different types of drills which may be employed with the inventive locking device; specifically in FIG. 6 there is shown a drill bit 56 of narrower gauge then the drill shank 20, and in FIG. 7, a drill bit 58 of larger gauge then at drill shank 20.

Thus, there is provided by the invention an adjustable rotatable tool and a holder in which the tool is adapted to be mounted at selected positions within the holder; the holder adapts the tool to be clutchably and declutchably engaged; and moreover, if desired, the mounting of tool to holder can be securely "clutched" by providing a securing member through the collar.

I claim:

1. In combination, an adjustable dental drill and a holder therefor, said drill further comprising a straight shank drill provided with graduated recesses along its shank for selectively positioning said drill within said holder, said holder further comprising a locking device for releasably holding said drill at the selected position, said holder being adapted to be itself mounted within a dental handpiece, said locking device further comprising a hollow cylindrically shaped stem rotatably mounted within a circular collar therefor, opening means provided through one side of said collar, tensioning means mounted to said collar and extending through said opening means so that the rotation of said collar about said stem will resultingly rotate said tensioning means along with it, said tensioning means being tensionably positionable within each of said graduated recesses, said opening means further comprising an elongated passage and said tensioning means further comprising a spring having a generally semicircular cross section with a resulting flat surface thereof facing and extending into a bore provided by said hollow stem and positionable within each of said recesses.

2. A device according to claim 1 wherein said spring is also shaped along its length into a straight portion extendable into said bore and a curved portion which is connected to said collar.

3. In combination a rotatable tool and a holder therefor, said tool including a straight shank portion, said shank portion being provided with at least one graduated recess along at least a part of its length for positioning said tool within said holder, said holder further comprising a locking device for releasably holding said tool, said holder being adapted to be itself mounted within rotation activating means therefor, said locking device including a stem rotatably mounted within a circular collar therefor, opening means provided through one side of said collar, and tensioning means mounted to said collar for rotation therewith, said tensioning means extending through said opening means so that rotation of said collar about said stem will resultingly rotate said tensioning means along with it between two positions, one of said two positions defining a locked position with said tensioning means being tensionally disposed within said recess for holding said tool, the other of said two positions defining a released position with said tensioning means being disposed out of said recess so that movement is permitted between said tool and said holder.

4. A device according to claim 3, wherein said shank portion is provided with a plurality of graduated recesses for selectively positioning said tool within said holder.

5. A device according to claim 3, wherein said tensioning means includes a spring, said stem being provided with a bore, said spring extending into said bore in said locked position and said spring being removed from projection into said bore in said released position.

6. A device according to claim 3, wherein additional means are provided for maintaining said tool in said locked position, said additional means including a releasable member engaging said tensioning means to hold said tensioning means within said recess of said tool.

7. In combination, an adjustable dental drill and holder therefor, said drill including a straight shank portion provided with graduated recesses along at least a part of its length for selectively positioning said drill within said holder, said holder further comprising a locking device for releasably holding said drill at the selected position and further comprising a hollow cylindrically shaped stem tightly rotatably mounted at one end thereof within a circular collar, opening means extending through one side of said collar, a spring mounted to said collar and extending through said opening means and tensionably positionable within each of said graduated recesses to provide a clutching action for said drill when said stem is rotated by said rotation activating means, wherein the rotation of said stem within said collar will in turn declutch said drill from the rotating influence of said rotation activating means.

8. A device according to claim 7 wherein said straight shank portion is wider than the drill portion.

9. A device according to claim 7 wherein said straight shank portion is narrower than the drill portion.

10. In combination, an adjustable dental drill and holder therefor, said drill including a straight shank portion provided with graduated recesses along at least a part of its length for selectively positioning said drill within said holder, said holder further comprising a locking device for releasably holding said drill at the selected position and further comprising a hollow cylindrically shaped stem tightly rotatably mounted at end thereof within a circular collar, opening means extending through one side of said collar, a spring mounted to said collar and extending through said opening means and tensionably positionable within each of said graduated recesses to provide a clutching action for said drill when said stem is rotated by said rotation activating means, and additional means for maintaining said drill in a secured clutched condition, said additional means further comprising a threaded pin threaded into said collar and projecting into a bore provided by said hollow stem and maintaining said spring in an engaged position within its respective selected graduated recess.